April 17, 1951      E. V. ANDERSON      2,549,041
BALL COCK
Filed March 31, 1947      2 Sheets-Sheet 1
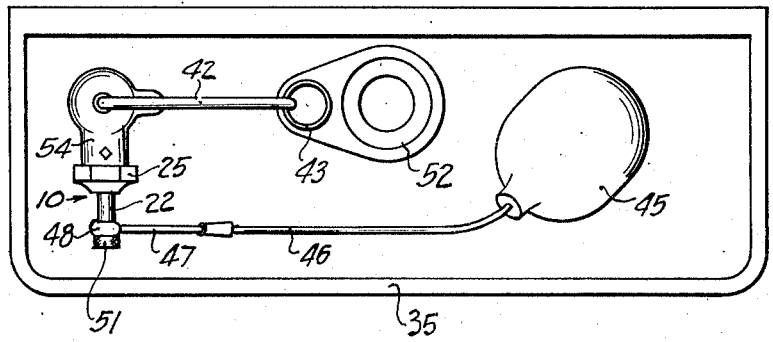
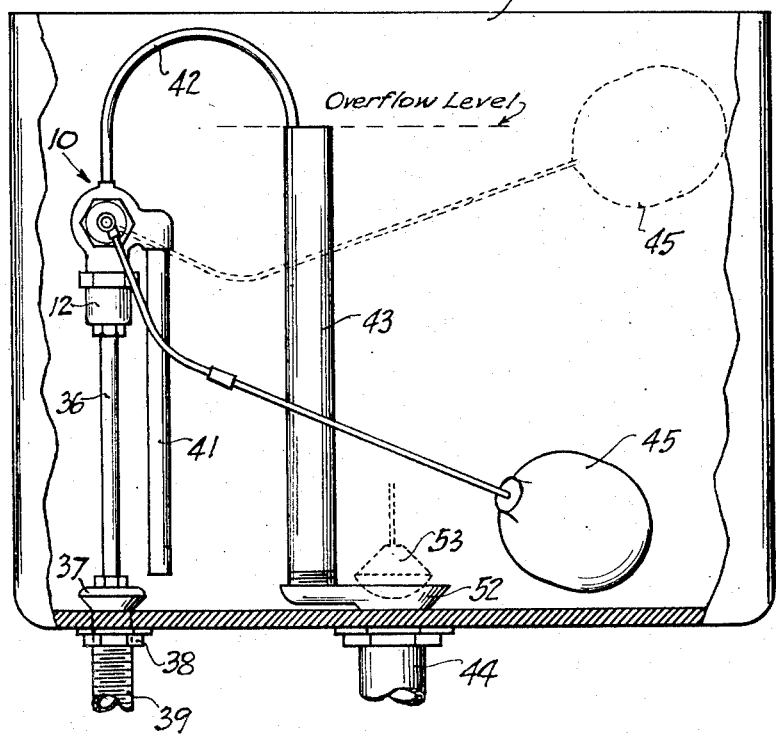
Inventor:
EDGAR V. ANDERSON,
By H. Mallinckrodt and
Philip A. Mallinckrodt,
Attorneys.

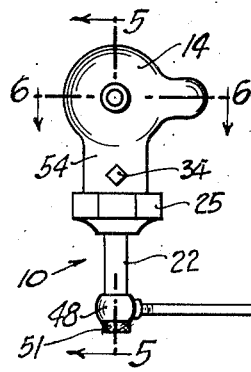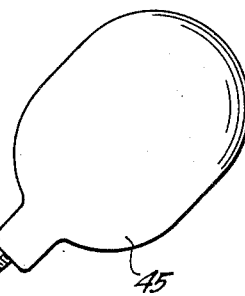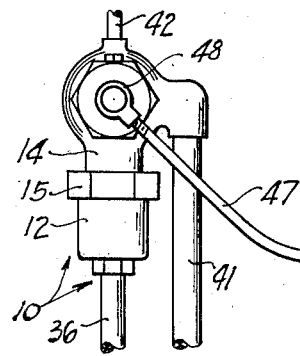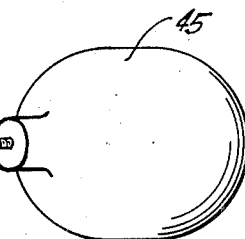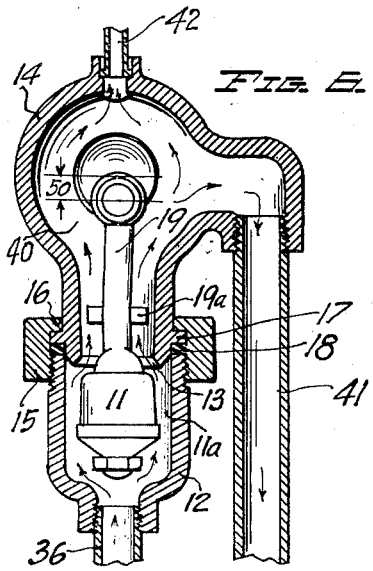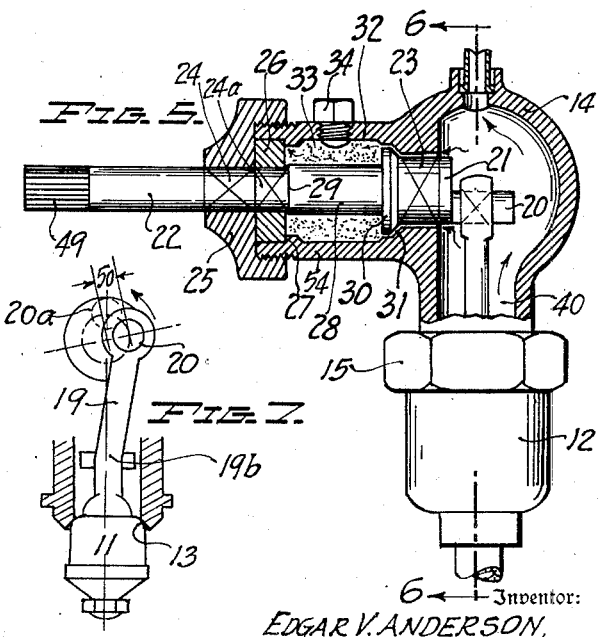

Patented Apr. 17, 1951

2,549,041

UNITED STATES PATENT OFFICE 2,549,041

BALL COCK

Edgar V. Anderson, Salt Lake City, Utah, assignor, by decree of court, to Ann Anderson Application March 31, 1947, Serial No. 738,302

6 Claims. (Cl. 137—104)

This invention relates to a new and improved ball cock for supplying water intermittently to toilet or other service tanks, but the invention is not necessarily restricted thereto.

Among the principal objects of the invention are to provide a device known to plumbers as a "ball cock," in which:

(a) Durability in a high degree is attained.

(b) Bearings of the operative parts have areas sufficient to keep them in proper alignment and in smooth working order for long periods of time.

(c) The operation is practically noiseless, because the water passages prevent the sharp whistling noises that are common in the restricted passages of ball cocks as heretofore constructed.

(d) A large capacity reservoir of lubricant, such as cup grease, is in communication with the main operating parts.

(e) A restricted quantity of water is caused to ooze into the grease reservoir.

(f) The pressure of the water in the supply pipe is exerted upon the effective area of the ball cock tending to close the same instead of acting continually to open the ball cock.

(g) A valve member is pulled against its seat by the rising of the float instead of being pushed against it as is common in prior practice.

(h) Working parts are easily accessible.

Other objects will appear as the following description proceeds.

In ball cocks as heretofore constructed, ball floats rise or fall with varying levels of water, but the limited power that can be derived from a ball float has resulted in mechanisms that almost without exception employ compound lever linkages of necessarily flimsy construction, in which excessive stresses cause undue wear upon the working parts. Moreover, the pressure of the water in such devices acts away from the valve seat instead of towards it, thereby making it necessary to restrict the water passages.

According to the invention, the valve member of the ball cock is suspended pendulum fashion from a crankshaft. This makes possible a proper ratio between the motion of the crank arm and the motion of the ball float arm and brings into play a considerable mechanical advantage without a multiplicity of working parts, besides causing the water pressure to seat the valve instead of tending to unseat it.

Briefly, the invention contemplates a ball cock in which the valve member is suspended from a crank at one end of a crankshaft, to which shaft at its opposite end, is fixed the stem that extends to the ball float. The latter, as it rises or falls with the fluctuating level of the water in the service tank, causes a rotative or oscillating movement upon the crankshaft, and during the upward movement of the crank exerts a closing stroke that operates to seat the valve member under mechanical pressure. To this mechanical pressure is added the water pressure acting upon the bottom area of the valve member. Because of this construction, water flows freely from the service pipe to the supply pipe as well as to the usual after-fill pipe. Also, it becomes possible if desired, to so locate the operating parts that the ball float has free and unimpeded movement at all times. Ample room is provided between the chamber in which the valve member moves, and the point where the valve hanger is mounted on the crankshaft, to accommodate a relatively large grease reservoir from which the bearings are lubricated.

In the accompanying drawing, which illustrates one embodiment of the invention,

Fig. 1 represents a plan of a flush tank equipped with the ball cock of the invention, the usual cover of the tank being omitted;

Fig. 2, a front elevation, the front wall of the tank being broken away in order to reveal the interior;

Fig. 3, a plan of the ball cock apart from the tank, this figure being drawn to an enlarged scale;

Fig. 4, a front elevation corresponding to Fig. 3, the lower portion being broken away for convenience;

Fig. 5, a fragmentary elevation, largely in section, taken on the line 5—5 in Fig. 3, drawn to a scale still further enlarged;

Fig. 6, a vertical section taken on the line 6—6 in either Fig. 3 (enlarged) or in Fig. 5, in either case reflected from a mirror plane, the direction in which the section is viewed being indicated by the arrows, the scale to which Fig. 6 is drawn being the same as is used in Fig. 5; and, Fig. 7, a line diagram showing an advantageous angular position of the crank arm in relation to the pendulum suspension.

Referring to the drawing, the numeral 10 denotes a ball cock having a valve member 11 which, in the present instance, is disposed to be moved up and down in a valve chamber 11a, the latter being formed in a fitting 12. The valve member 11 closes against a seat 13 at the lower end of a recessed body or housing 14. The fitting 12 is fastened to the housing 14 by any suitable means, for illustration, a nut 15 that is threaded on the fitting 12 and has an inwardly extending circular flange 16 which bears on an outwardly extending collar portion 17 that is shown as being integral with the housing 14. A gasket at 18 makes a watertight connection between the housing 14 and the fitting 12.

The valve member 11 is mounted at the lower end of a hanger 19 and is thereby suspended pendulum fashion from a crank 20 that in this instance extends outwardly from a head 21, both the crank and the head being preferably integral with a crankshaft 22 located within the housing 14. The crankshaft is advantageously supported in bearings having large areas, and so spaced apart from each other that no wobbling or pinching of the crankshaft occurs. At the same time, means is provided for greasing the bearings, such means including a grease reservoir, presently to be described, that contains a supply of grease closely adjacent the bearings and sufficient to last for years.

In the drawing, the crankshaft bearings are shown at 23, 24, and 24a, the bearing 23 being located in a bored portion of the housing 14, while the bearings 24 and 24a are located in a bore extending through a cap 25 and a blind collar 26, respectively. The cap 25 is preferably threaded on the housing 14 while the collar 26 rests in a counterbore in the housing and bears axially against a shoulder 27, being secured in place by the cap 25. At 19a are guide lugs that prevent excessive swinging of the hanger 19 and its valve 11.

The crankshaft has an enlarged portion 28 forming a shoulder 29 closely adjacent the collar 26. At 30, adjacent the bearing 23, is an integral collar having a circumferential face that cooperates with a slightly spaced apart seat 31. This allows the crankshaft to have a small, though limited, axial movement for a purpose that will appear presently.

In order to firmly support the crankshaft 22 against wobbling, and at the same time provide a large and practically permanent supply of grease, the respective bearings 24 and 24a are spaced apart an appreciable axial distance from the bearing 23. This provides a reservoir 32 for lubricant, such as cup grease 33, the latter being conveniently introduced through an opening that is normally closed by a removable screw 34 or other suitable device.

The structure so far described, when installed for use in a service tank 35, contemplates mounting the fitting 12 on a supply pipe 36 that is connected by means of a flange 37 and nut 38 to a water service pipe 39, in the usual manner. Water from the supply pipe 36 enters the chamber 11a when the valve member 11 is open, as in Fig. 6, then flows into and through the passage 40 of the housing 14, and continues into and through the delivery pipe 41 from which it is discharged into the tank 35.

It will be observed that the improved construction made possible by the invention, provides a large and unobstructed conduit extending from the supply pipe 36 to both the delivery pipe 41 and the after-fill pipe 42, such conduit, in the present instance, being represented by the aforesaid passage 40, so that objectionable noises that prevail in ball cocks of the usual types, are practically eliminated. At the same time, the passage 40 provides ample room for the unimpeded operation of the crank 20 and the valve hanger 19 depending therefrom.

In operation, water rushing through the passage 40 causes a film of this water to squeeze through the small circumferential space around bearing 23 and collar 30, and to ooze into the reservoir 32. This exerts a certain beneficial influence upon the content of the reservoir, and brings about decided lubrication effects upon all the bearings. The grease 33 is selected according to the required viscosity.

In this efficient, trouble-free system of lubrication virtually no grease exudes from the bearings, while at the same time the satisfactory operation of the device of the invention, as actually installed, is assured for long periods of use.

The crankshaft is oscillated by means of a ball float 45 having a stem 46 that preferably is screwed into an arm 47, which in turn is fixed on the end of the crankshaft 22, for example, by means of a hub 48 that engages the splines 49 whereby the arm 47 is set in the proper angular relation to the arm 50 of the crank 20. In order to properly seat the valve member 10, and to maintain this seating, the angular relationship between the operating arm 47 and the crank arm 50 must be such that in the upward travel of the crank 20, the valve becomes seated before its line of suspension can come into a vertical position, and, as illustrated, is accomplished by the effective length of hanger 19. This condition is illustrated in the diagram of Fig. 7, and, as illustrated, is accomplished by the effective length of hanger 19.

The hub 48 is conveniently held in place by means of a thumb screw 51 that can easily be applied or removed manually without requiring any special tool.

The convenience of the clean cut arrangement of the apparatus of the invention is obvious in Figs. 1 and 2. In this arrangement the usual outlet fitting 52, that is connected to the flush pipe 44 and provided with the usual bulb valve 53, is far back in the tank 35 out of any line of interference with the float 45 or its stem 46. Also, the overflow pipe 43 that is screwed in the fitting 52, is in convenient alignment with the after-fill pipe 42. This leaves all parts of the apparatus freely accessible.

Some of the novel features may be reviewed and stressed as follows:

In Fig. 7 it is shown that during the upward travel of the ball float 45, Fig. 2, the valve member 11 is completely seated before the crank 20 reaches the uppermost point 20a of its possible travel. The slight bend 19b in the hanger 19 acts to seat valve 11 squarely, the lower portion of such hanger being vertically disposed in the seating position of the valve, as illustrated.

In Fig. 5 the restricted space between the beveled collar 30 and its seat 31 assists in obtaining satisfactory lubrication, first, because a minute film of water, under a certain pressure, is caused to enter lubricant reservoir 32. The water is given an almost infinitesimal, but sure, pumping action that is instrumental in distributing the lubricant, and that at the same time exercises a certain kneading effect on the lubricant 33, thereby keeping the latter from becoming hard. The second advantage is that the fluctuating water pressure on the outer face of head 21, and then on the inner face of the collar 30, when the water is evacuated from passage or conduit 40, allows limited axial reciprocation of crankshaft 22, thus serving to work lubricant into the bearings 23, 24 and 24a. A small quantity of the lubricant also finds its way along the head 21 and down to the bearing of the hanger 19 on crank 20. Since the flow of water through the passage or conduit 40 is unobstructed, the supply pipe 36 and the after-fill pipe 42 leading out of the upper part of housing 14 can be made more ample in size than is usually the case. This is accomplished by placing the crankshaft in an extension 54 that branches transversely from the housing 14 so that substantially only the crank overhangs the valve chamber in the lower part of which the valve is seated.

Novel features of the invention are applicable also to faucets of various kinds.

While a specific embodiment of the invention is herein shown and described, the scope of the invention is limited only by the following claims.

What is claimed is:

1. A ball cock comprising valve means; seat means for said valve means; a crankshaft having a crank arm and a crank; a hanger by which said valve member is operatively suspended pendulum-fashion from said crank, said hanger having an effective length such that the valve means will seat before the crank reaches its uppermost position; and float means operative to seat said valve means, said hanger being bent so that its lower portion is vertically disposed in the seating position of said valve means.

2. A ball cock according to claim 1, wherein said crank arm includes a crank head; bearing means for said crank head; other bearing means spaced axially apart from the first-mentioned bearing means; lubricating means disposed in the space between the two said bearing means; water-film conduit means formed by the said crank head and its said bearing means, said conduit means leading into the space occupied by the lubricating means.

3. A ball cock according to claim 2, wherein said crankshaft is movable axially, so as to promote lubrication of said bearing means; and means are included to limit the axial movement of said crankshaft.

4. A ball cock comprising a crankshaft having a bearing head; a crank extending from said head; valve means operatively suspended from said crank; a water conduit in which said bearing head, said crank, and said valve means are housed; valve seating means disposed relative to said water conduit and said valve means to enable the latter to control passage through said water conduit; a reservoir for lubricant adjacent said bearing head; and means effective to admit small quantities of water from said conduit into said reservoir.

5. A ball cock according to claim 4, but including an after-fill pipe and a supply pipe, both of said pipes leading out of the upper part of said water conduit.

6. A valve mechanism comprising a housing having a substantially vertical valve chamber and an upper extension branching transversely from said housing; a crankshaft journaled in said extension; a crank overhanging from said crankshaft into said valve chamber; valve means disposed in the lower part of said valve chamber; valve seating means disposed relative to said valve chamber and to said valve means to enable the latter to control passage through the said valve chamber; a hanger operatively connecting said valve means to said crank; a reservoir defined by said housing extension, and restricted passage means about said crankshaft between said valve chamber and said reservoir, affording communication therebetween.

EDGAR V. ANDERSON.

REFERENCES CITED

The following references are of record in the file of this patent:

UNITED STATES PATENTS

| Number | Name | Date |
| --- | --- | --- |
| 493,567 | Storer | Mar. 14, 1893 |
| 938,470 | Frost | Nov. 2, 1909 |
| 1,200,961 | Mabe | Oct. 10, 1916 |
| 1,883,480 | Bauer | Oct. 18, 1932 |
| 1,886,058 | Shoemaker | Nov. 1, 1932 |
| 1,893,859 | Gleason | Jan. 10, 1933 |
| 1,930,027 | Abraham | Oct. 10, 1933 |
| 1,955,495 | Hack | Apr. 7, 1934 |